United States Patent [19]
Sloane et al.

[11] Patent Number: 5,813,863
[45] Date of Patent: Sep. 29, 1998

[54] INTERACTIVE BEHAVIOR MODIFICATION SYSTEM

[76] Inventors: Sharon R. Sloane, 4636 Cherry Valley Dr., Rockville, Md. 20853; Jeffrey R. Hall, 10912 Orleans Way, Kensington, Md. 20895

[21] Appl. No.: 637,970

[22] Filed: May 1, 1996

[51] Int. Cl.⁶ ............................ G09B 19/00; G09B 7/00
[52] U.S. Cl. ............................................ 434/236; 434/323
[58] Field of Search ................................. 434/118, 219, 434/220, 236, 237, 322, 323

[56] References Cited

U.S. PATENT DOCUMENTS 5,676,551 10/1997 Knight et al. ........................ 434/236

OTHER PUBLICATIONS

Miller, Cyndee, Guys on Game for Girls Don't Do Karate Kicks, Marketing News, vol. 29 No. 25, p. 2, Dec. 1995.
Hordern, Barbara, Cyberbuzz: Computer Games Girls Can Relate To, Working Woman, vol. 21, No. 1, p. 14, Jan. 1996.
Virtual High School, Civilization, Sep. 1996.

*Primary Examiner*—Richard J. Apley
*Assistant Examiner*—John Edmund Rovnak
*Attorney, Agent, or Firm*—Law Offices Of Royal W. Craig

[57] ABSTRACT

A multimedia behavior modification system for promoting awareness and changing high-risk behaviors in areas of significant concern, for example, HIV/AIDS, diabetes, eating disorders, Alzheimer's disease, heart disease, smoking cessation, substance abuse, campus violence, etc. The system includes the computer courseware and two exemplary architectures for presenting the courseware. The computer architectures may be a generic computer with specific multimedia capabilities, and a kiosk-type device with touch-screen capabilities. The courseware can also be delivered over a local area network (LAN), wide area network, or the internet. The courseware includes a selectable progression of modules including dynamic introductory modules leading to a combination of educational modules. The introductory modules are an installation step, a title page, an attention-getting teaser step, and a main menu. The main menu module provides user-selectable links to multiple primary learning modules. In addition, while a user is navigating the foregoing modules, a tracking module tracks the users decisions and other characteristics and alters the program content accordingly. The unique combination of primary learning modules includes an interactive/contextual adventure, local information, topical encyclopedia, and subject matter quizzes. The interactive/contextual adventure module gives each user a first hand virtual experience of the cause and effect results of his/her own habits and behaviors which increase the risk of such diseases. The disclosed system embodiment is described in the context of AIDS awareness and education. However, it may be readily adapted for other subjects. The "courseware" remains constant and allows easy change to the audio-visual subject matter presented to a user. The virtual experience provided by the system can be easily and unique developed to appeal to any particular social, cultural, or economic class, or any other segment of the population.

12 Claims, 10 Drawing Sheets

INTERACTIVE BEHAVIOR MODIFICATION SYSTEM

BACKGROUND OF THE INVENTION

1. Field of the invention

The present invention relates to educational systems, and, more particularly, to a device and method of computer-implemented multi-media instruction that promotes behavior modification by role play and cause-and-effect decision-making in order to eliminate habits that compromise, for instance, the public health.

2. Description of the Background

There are over 40,000 new human immunodeficiency virus (HIV) infections in the United States each year. In February of 1996, the number of diagnosed cases of AIDs in the U.S. reached 500,000. It has become the number one cause of death of people aged 25–44 years (ahead of accidental injury). All of this is evidence that HIV education and prevention efforts have heretofore failed to stop the epidemic. Also, the prospects for a near-term cure are remote and this underscores the importance of HIV prevention and education. Over a decade of experience with HIV has demonstrated that lasting changes in individual behaviors are needed to avoid infection. However, social, cultural, and attitudinal barriers limit the effectiveness of existing HIV education programs. A successful educational program must be capable of reaching those groups most at risk of transmitting and contracting HIV. However, such groups span a diverse cross-section of the population, and traditional methods have failed to impact many of them. The traditional methods entail conventional classroom teaching of AIDS awareness/prevention including written materials and/or lectures. Effectiveness can be gauged by homework assignments and/or tests which measure retention of the material. There are also mass media campaigns which attempt to educate and/or modify behavior. However, such campaigns generally prove ineffective as a stand-alone tool. They are expensive and in need of constant reinforcement to have any long term effect. None of the traditional methods have succeeded at reaching high-risk populations including adolescents and young adults, nor do they measure with any credibility the attitudes and behaviors of the groups that can be reached. Even if they could, their format and tone has proven incapable of achieving any lasting behavior change within the groups. Educators have long recognized that the effectiveness of these conventional methods varies not only across cultural and economic groups, but also varies with age and aptitude. Provision must be taken of differing rates of learning, the need for individual attention, and cultural, ethnic, and environmental differences. Meanwhile, the number of individuals in need of HIV/AIDs education grows as HIV infection increases exponentially, even outside of the traditional "high-risk groups". This increase in need and scarce fiscal resources puts a great burden on the educators to standardize their approach, which in turn yields an even lower effectiveness. There are alternate teaching methods such as self-study programs and videotaped programs which more efficiently use time and resources. However, these methods are generally ineffective within some target groups where users lack the ability, motivation, or discipline to teach themselves.

It is recognized that the effectiveness of teaching programs can be increased by interspersing the educational material with audio-visual stimuli designed to attract the attention of the recipient. Such stimuli may include familiar scenarios that put the information in context, or popular songs, humor, pictures, etc. Such material tends to break down any existing cultural barriers and catches the interest of the students. It is also known that a "learning-by-doing" or experiential approach is the most effective. When AIDS-related information is presented in the context of the first hand experiences leading to an increased risk for HIV, learning is greatly facilitated. Unfortunately, first hand experience is an unforgiving teacher in the AIDS arena. Fortunately, computer and digital technology provides the ability to create "virtual experiences", which can be used as powerful teaching tools. It would be greatly advantageous to provide a computerized system and method for promoting HIV/AIDS awareness by synthesizing HIV/AIDS facts and statistics with advance prevention methodologies in a multimedia educational program which gives a first-hand virtual experience to the user of the decisions that lead to an increased risk of HIV and/or any other public health concerns. Virtual reality would take a front seat over theory, and this would help to capture the attention of those groups most at risk. The system and method would have the potential to be effective at achieving lasting behavior change and true behavior modification.

SUMMARY OF THE INVENTION

In accordance with the above, the present invention is an innovative multimedia behavior modification system for promoting awareness and changing high-risk behaviors in areas of significant public health concern, for example, AIDS. The system includes a method ("computer courseware") as well as two architectures for presenting the courseware. The computer architectures may be a generic computer with specific multimedia capabilities, and a kiosk-type interface with touch-screen capabilities. The courseware can also be delivered over a local area network or a wide area network, or the internet. The courseware includes a selectable progression of modules including dynamic introductory modules leading to a combination of educational modules. The introductory modules are an installation step, displaying of a title page, an attention-getting teaser step, and a main menu. The main menu module provides user-selectable links to any of multiple primary learning modules (there are four primary learning modules in the disclosed exemplary embodiment). In addition, while a user is navigating the foregoing modules, a tracking module tracks the user's decisions and other characteristics and alters the program content accordingly. The unique combination of primary learning modules includes an interactive/contextual adventure, local information, topical encyclopedia, and subject matter quizzes. The interactive/contextual adventure module gives the user a first hand virtual experience of the cause and effect results of their own habits and behaviors which increase the risk of such diseases. Although the illustrated system embodiment is described in the context of AIDS awareness and education, it may be readily adapted for teaching other subjects such as diabetes, eating disorders Alzheimer disease, heart disease, smoking cessation, substance abuse, campus violence, etc. The "courseware" remains constant and allows easy change of the audio-visual subject matter presented to a user. The virtual experience provided by the system can be quickly and uniquely developed to appeal to any particular social, cultural, or economic class, or any other segment of the population so as to provide tailored intervention.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENTS

The present invention is a system including both the architecture and novel software-implemented method for effecting behavior modification in furtherance of the public health and welfare.

The present system was specifically designed for promoting awareness and changing high-risk behaviors in areas of significant public health concern, for example, AIDS. This is accomplished by novel multimedia courseware including dynamic introductory materials leading to a novel combination of educational modules. One particularly novel module gives the user a first hand virtual experience of the causes and effects of their own habits and behaviors which increase the risk of such diseases. Of course, there are many other potential applications and contexts in which the system will find usefulness. Although the presently preferred embodiment will be described in the context of AIDS awareness and education, it can be readily adapted for teaching other subjects. The "courseware" remains constant and allows easy change to the audio-visual subject matter presented to a user. Hence, the virtual experience provided by the system can be easily and uniquely developed to appeal to any particular social, cultural, or economic class, or any other segment of the population so as to provide a tailored intervention. The term "courseware" as used throughout this specification is meant to comprise the combination of control programs and operational flow which presents the subject matter to the student at a workstation, e.g., mechanics and method. Only the content needs to be changed, and other applications incorporating different content are considered to be within the spirit and scope of the invention.

The present capability exists to deploy the software method of the present invention on different computer architectures including a generic computer with specific multimedia capabilities, a kiosk-type interface, and local or wide area networks. The first two will be described in detail.

Figure 1:
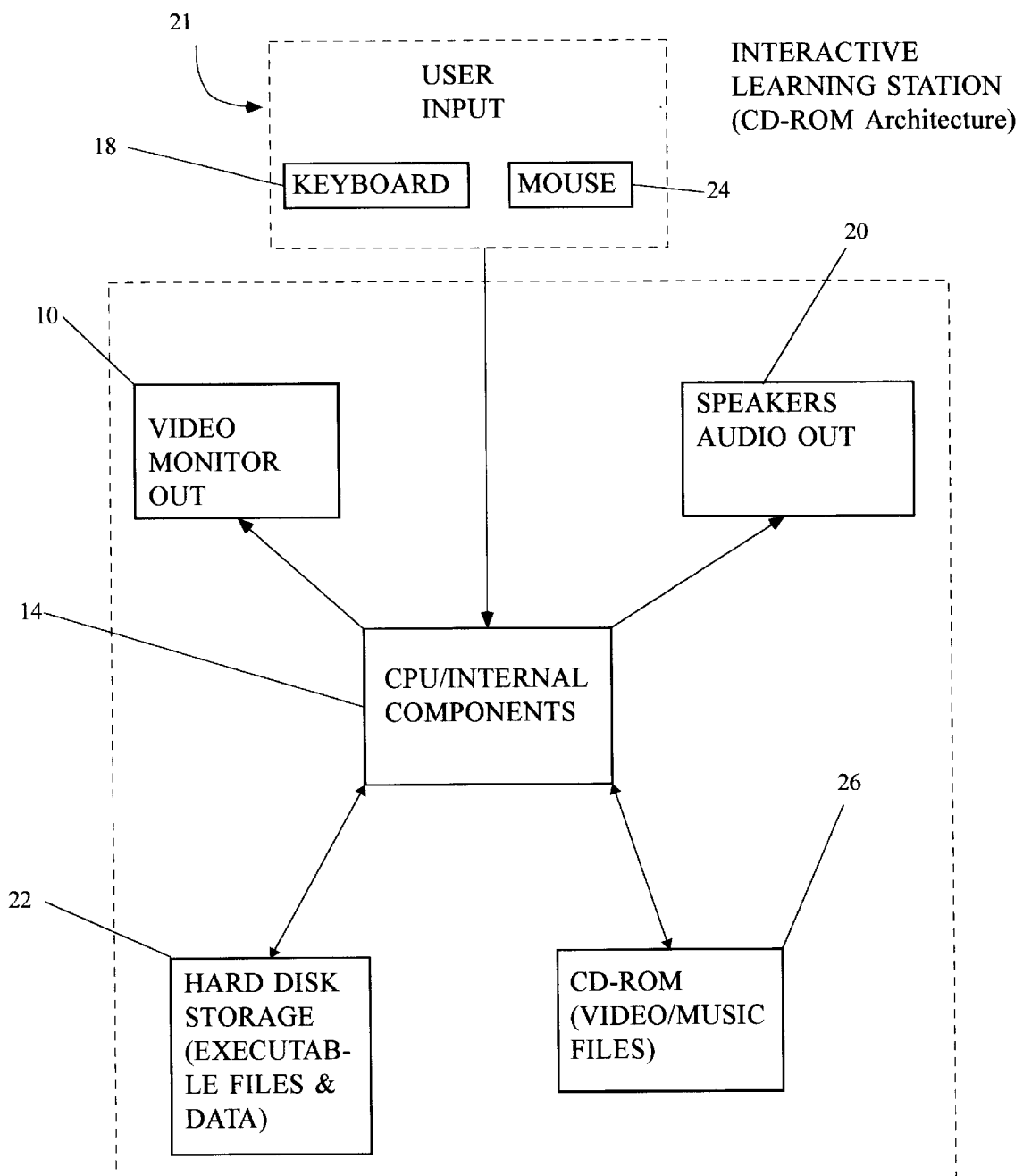
FIG. 1 is a block-diagram of a CD-ROM computer architecture including the components necessary to run the software of the present invention.

FIG. 1 is a block-diagram of a CD-ROM computer architecture including the components necessary to run the software of he present invention.

To employ the CD-ROM architecture as shown in FIG. 1, each user will be provided with a workstation that may comprise all of the devices indicated in block form within the dotted lines of FIG. 1. The workstation can, for example, be a conventional personal computer and the CPU/Internal Components 14 can be those which are commonly integrated therein, e.g., an Intel Pentium microprocessor with Triton peripheral chipset mounted on an appropriate motherboard.

Of course, other more or less powerful computer systems can be used, but it is suggested that minimum system performance is realized with a 66 Mhz CPU processor with 8 Mb of RAM. The system may be easily exported to run on a MacIntosh operating system and minimum system requirements are comparable to the above-described PC-based requirements.

The user output includes a monitor/video output device 10 which can be a conventional monitor attached via a serial port to the CPU/Internal Components 14. It is suggested that best video results are gained with an SVGA 17" monitor with 1024×768 pixel resolution. Audio output 16 is also provided, and this may comprise an input/output board which allows the computer to send sounds, including voice and music, to a student via headphones or speakers.

The user input 21 is through a pointing device such as a mouse 24. Of course, the pointing device can be any type of conventional pointing device including a pen, trackball, or touch-screen monitor.

Hard disk storage 22 is a commercially available disk drive attached via known IDE or SCSI interfaces to the CPU 14.

The CD-ROM device 26 is a standard CD-ROM (compact disk-read-only memory) for storing executable files to be downloaded to the hard disk storage 22, and for maintaining other necessary files such as video and audio clips which can readily be accessed by the CPU/Internal Components 14 as they run the executable files.

The architecture must also include certain resident firmware including an operating system such as Windows 95® by Microsoft, appropriate drivers for all internal components and the above-described devices, and MPEG-compliant playback software and/or hardware for playing MPEG compressed full-motion video clips.

The foregoing description of the system architecture will be understood by one skilled in the art as merely an example of one system which could be used to implement the various embodiments of the educational method of the present invention described in detail below and, and that various other configurations and devices could also be used.

The software of the present invention may be authored using any appropriate multimedia authoring program, preferably having the capability of creating executable files that can be run on as many computing platforms as possible (especially a generic personal computer platform). It is suggested that "Macromedia Director" from Macromedia, Inc., incorporates the necessary features and qualities. This software allows the multimedia developer to develop content for the courseware in the form of "cast members", e.g., multimedia clips which may be text pages, pictures, graphics, buttons, digital sound files, digital video files, palettes and scripts. The scripts are small executable programs that are related to particular objects and are executed as the result of an event such as clicking of a mouse button, pressing a key, touching a screen, etc. The scripts are written in an object oriented programming language called "Lingo" which defines the relationships between all objects in the system and provides a framework for tracking user responses. Macromedia Director simplifies the authoring process by allowing all defined cast members to be selectively included in the program by placing them in a "Score Window" that has the capacity of supporting 48 channels each corresponding to one cast member of text, graphics, digital video, audio, etc. Macromedia Director is also capable of easily migrating from PC-based executable files to Macintosh-based with little additional programming.

Figure 2:
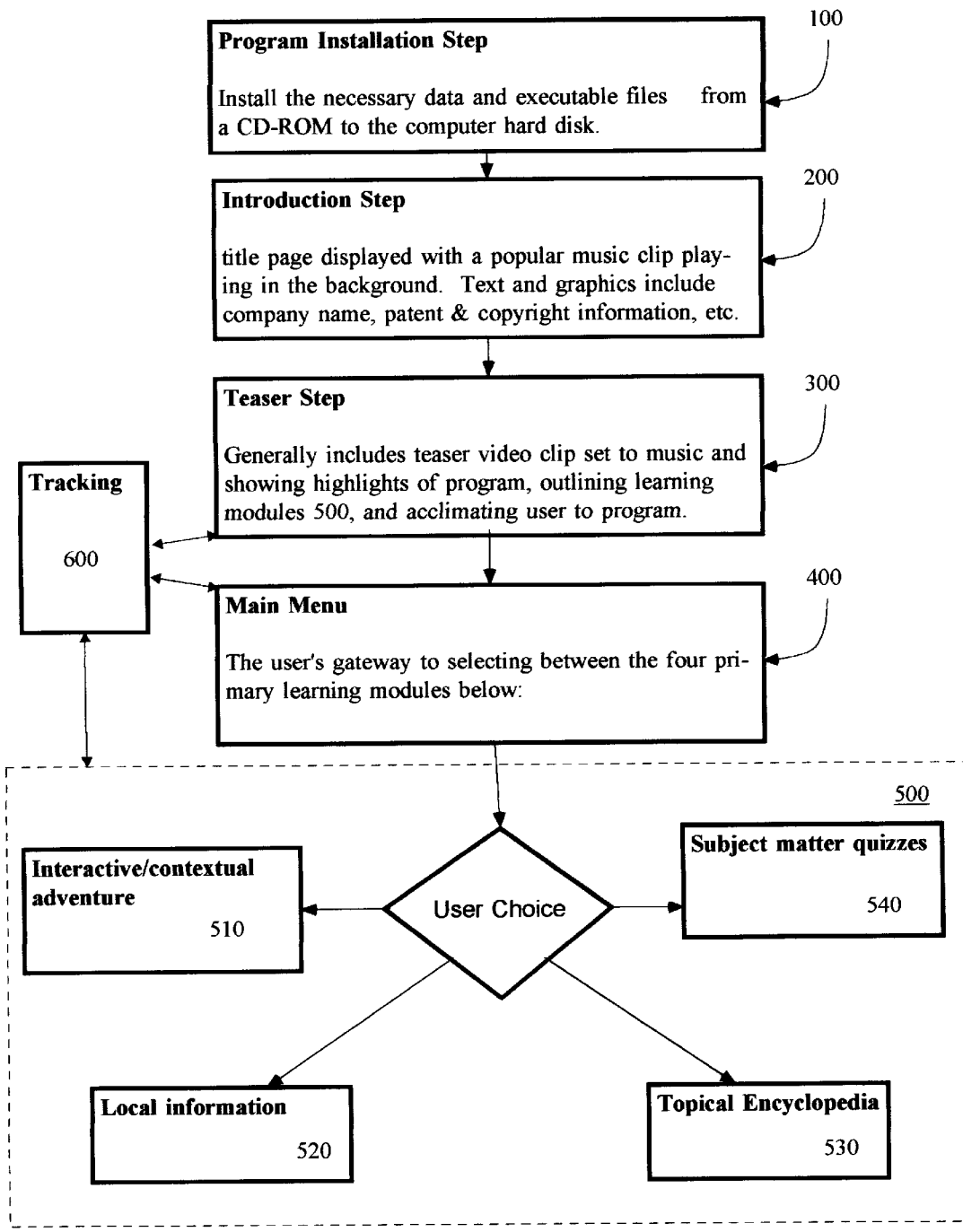
FIG. 2 is a block diagram overview of the program organization and flow.

FIG. 2 is a block diagram overview of the program organization and flow from program installation step 100, to displaying of the title page 200, to an attention-getting teaser step 300, and finally on to the main menu 400 which provides user-selectable links to any one of the four primary learning modules 500. All the while that a user is navigating the layout of FIG. 2, the program tracks the users decisions and other characteristics at tracking module 600. The local (user-specific) information gained from tracking module 600 is processed and used in administering the program to the immediate user. Global (multiple-user) data is used to customize the program for each particular target audience, and to inform local health authorities of specific behavior areas that need continued intervention.

Program installation 100 is presently best accomplished by installing the necessary scripts and executable files from a CD-ROM. A CD-ROM is the preferred medium because it is capable of storing large multimedia files including video and audio clips which, along with the executable programs and scripts, take up several hundred Mb of disk space. Upon installation, only a subset of executable programs and scripts are copied from the CD-ROM to the computer hard disk. The authoring software itself is not installed to the hard drive, but the resulting executable file and other necessary files generated by it are. The main executable file is a standard Windows application, and it can be run on any PC platform.

In operation, the executable file is copied to the hard disk and is run at installation step 100.

At introduction step 200, the title page is displayed with a popular music clip playing in the background. The text and graphics may include any appropriate introductory subject matter such as company name, copyright information, patent information, etc.

The program proceeds to the teaser step 300, which generally includes a 1 minute teaser video clip set to music and showing inviting highlights of the program, outlining the learning modules 500, and acclimating the user to the major learning techniques. It has been found that the teaser step 300 is effective in initially capturing the user's attention. It is important that the user identify with the music and images shown in the teaser step. Consequently, the music and images may be easily changed to target any particular cultural cross-section. The teaser step 300 conveys the preliminary and instructional material in the context of a familiar environment, and thereby sets the stage for the user's personalization of the learning modules to come. Both the format and content of the teaser step 300 should reflect the culture of the intended user group. In the present context of the ADS focussed system it has been found that a teaser step 300 in the format of a music video works well, as this is a format well-embraced by the intended target audience. The content is a popular song and video clips. Meanwhile, a voice-over describes and outlines the learning modules 500. It is equally important that the voice over reflect the culture of the intended user group, e.g., it should speak in an appropriate lingo.

Main Menu 400 is the user's gateway to selecting between the four primary learning modules 500: 1) the interactive/contextual adventure 510; 2) local information 520; 3) topical encyclopedia 530; and 4) subject matter quizzes 540.

All the while that the user is navigating the above-described steps, a tracking module 600 is keeping track of user information and decisions. The local (user-specific) information gained from tracking module 600 is processed and used in administering the program to the immediate user. Global (multiple-user) data is used to customize the program for each particular target audience, and to inform local health authorities of specific behavior areas that need continued intervention.

The Interactive/Contextual Adventure 510 is a powerful tool for teaching the subject matter at hand and generating true cause and effect awareness of the results of high-risk patterns of behavior. In the field of psychology the term "behavior modification" is known to mean any method designed to produce behavior change that persists beyond the point where such method is discontinued. See, Bandura, A., Principles of Behavior Modification (1969). The method of teaching as administered by the present system may be capable of true behavior modification. The method enables the user to become and remain optimally aware of the results of their behavior choices within the context of their own sub-culture, environment and pressures. This experience informs the user to establish and maintain a lifestyle which reduces the risk of HIV infection, and may motivate him/her to actually do so.

The Interactive/Contextual Adventure 510 presents the user with a "virtual experience" which allows the user to learn by living through typical social encounters. The user makes actual decisions while enduring all normal outside influences such as peer pressure, need for immediate gratification, etc. The user is shown the results of his/her decision in vivid detail.

The virtual experience is based on a decision tree structure in which the user is prompted to make decisions at regular intervals, preferably once every 45 seconds or so. Each decision is woven through a continuous interactive user-driven story that sets up the context of critical behavior decisions. The presentations include a series of very real video/audio clips with complementing scenario risk assessments and contextual decision advice. It is important to the effectiveness of the present learning system that all such clips be culturally familiar.

Four particular features operate in combination to heighten the reality of the virtual experience provided by the Interactive/Contextual Adventure 510. This in turn helps to bring about behavior modification. The features are as follows: 1) first person perspective with selectable character to insure that all multimedia stimuli are culturally familiar; 2) real life decision sequence in which decisions are cumulative; 3) the capability to impair one's own judgment by poor decisions with regard to taking alcohol, drugs, etc.; 4) virtual advisors that embody the thought process, express conflicting viewpoints, and foreshadow the range of possible outcomes of the decisions to be made.

The first person perspective is key to the "learning-by-doing" or experiential approach of the present invention. When AIDS-related information is presented in the context of a first hand experience of the behaviors leading to an increased risk of HIV infection, learning is greatly facilitated. Hence, all of the AIDS-related information is taught within the context of a first hand virtual experience. The user senses and evaluates each social situation along the decision tree through the ears and eyes of a virtual "character". The user identifies with the character, and all multimedia stimuli and questions are directed to the user. Consequently, in navigating the decision tree the user becomes the character and is given the impression of being there. All decisions are first hand and in the middle of an actual social situation with all accompanying influences, e.g., peer pressure, sexuality, ethics, boredom, vanity, etc. To further increase the user's identification with the character, the target audience is researched for personal information before a system is installed. The information may include such details as age, gender, race, nationality etc., and be used by a company/local health care provider to tailor the system video/audio content so as to be culturally familiar. As an optional feature, each user of the system can be prompted to input personal information to tracking module 600 for use in initializing the Interactive/Contextual Adventure 510. The program content can be delivered in accordance with the personal information, e.g., if the user is a Hispanic female, the virtual character will be a Hispanic female, voice clips will be of Hispanic female dialect, video clips will be tailored to show Hispanic female social situations, etc. Of course, there are other archived clips which are used for other specific combinations of race and gender, e.g., white males, black females, etc. The tailored content helps to increase the user's identification with the character and familiarity with the social surroundings, and greatly increases the teaching potential of the system as a whole.

A second feature of the Interactive/Contextual Adventure 510 that serves to heighten the reality of the virtual experience is the administration of a real life decision sequence in which the effects of the user's decisions are cumulative.

Figure 3:
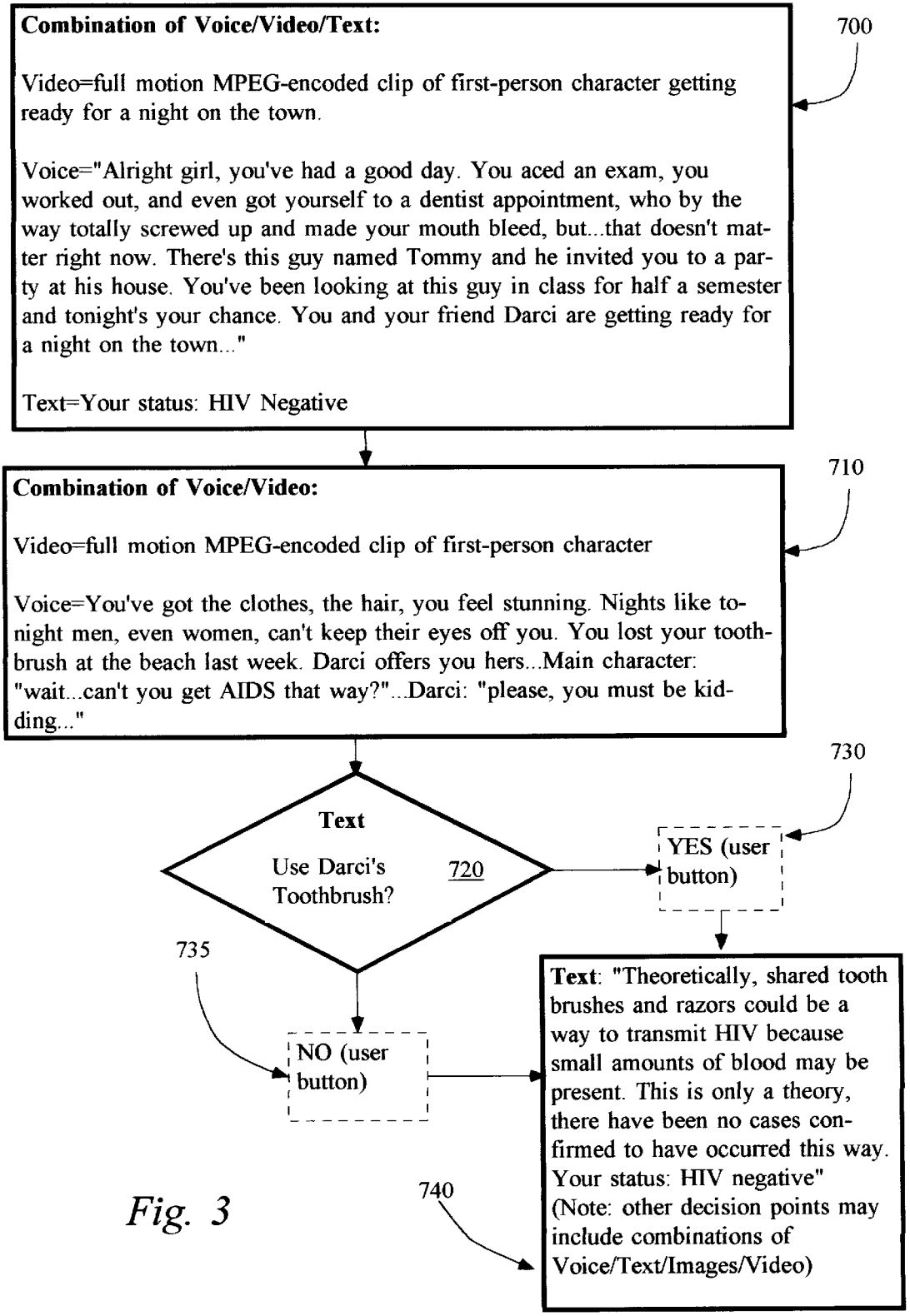
FIG. 3 is a flow-chart of an exemplary decision sequence in the interactive/contextual adventure 510 in which AIDS-related information is taught in the context of a first hand virtual experience. It is intended that the user learn the behaviors and decisions that lead to an increased risk of HIV.

FIG. 3 is a flow-chart of an exemplary decision sequence during the Interactive/Contextual Adventure 510 in which AIDS-related information is taught in the context of a first hand virtual experience. It is intended that the user learn the behaviors that lead to an increased risk of HIV infection.

Block 700 represents a combination of video, voice and text display which sets the context of the situation. The sequence progresses to block 710 which by voice and video sets the context of a particular decision the user must make. The question is displayed at step 720, and the user is presented with two buttons (yes 730 and no 735) that are displayed on the screen. In this particular case, the user makes a selection and despite the answer gets the same immediate feedback at step 740. Of course, in other situations, the feedback may differ depending on the decision made.

The entire interactive/contextual adventure 510 is a succession of presentations and decisions similar to that shown in FIG. 3, and the decision tree structure forms the foundation for the interactive/contextual adventure 510. The virtual experience is based on first-person, real-life, real-time decisions at regular intervals and in the context of a familiar virtual social situation. The effects of the user's decisions are cumulative. In other words, there are a limited number of outcomes from the decision tree (HIV positive or negative), but multiple paths for reaching the outcomes. The paths can be independent, linked and cross-linked. Therefore, the user will rarely experience the same interactive/contextual adventure twice.

With regard to the interactive/contextual adventure 510, it is again important to note that other subject matter may be substituted. Only new "cast members" must be inserted, e.g., alternate multimedia clips including new text pages, pictures, graphics, buttons, digital sound files, digital video files, palettes and scripts dealing with the other subject matter. For instance, the system may be used to address diabetes, eating disorders, Alzeimers, disease heart, disease, smoking cessation, substance abuse, campus violence, etc., by including clips and questions in the appropriate modules dealing with the appropriate considerations. The courseware of the invention provides the opportunity to easily create and integrate new subject matter systems and update the current educational material for presentation to the users.

A third feature of the Interactive/Contextual Adventure 510 that serves to heighten the reality of the virtual experience is the capability of the user to impair his/her own judgment by making poor decisions, such as imbibing in too much alcohol, drugs, etc.

Figure 4:
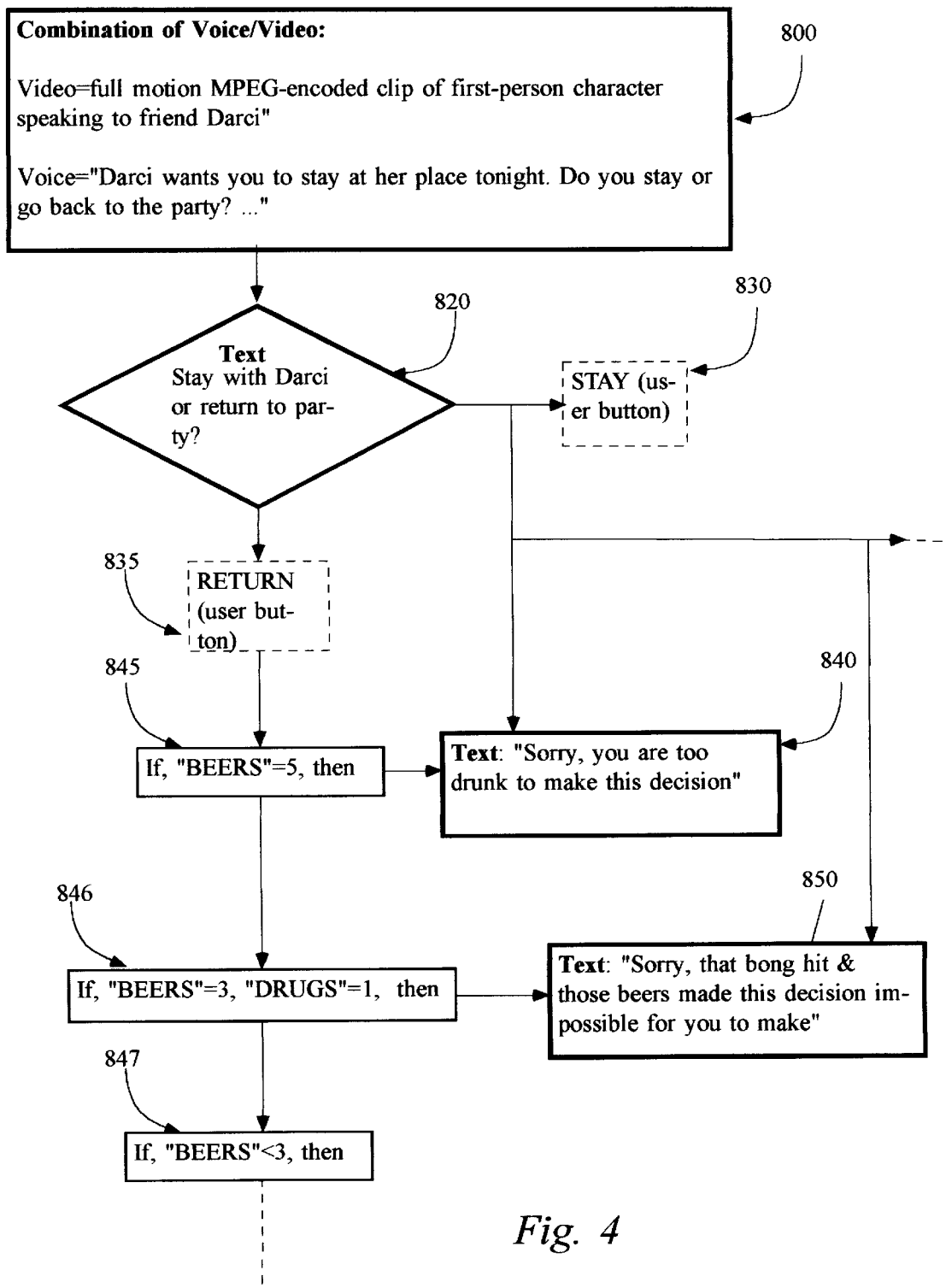
FIG. 4 is a flow-chart of an exemplary decision sequence in which the user's judgment has been impaired by past decisions.

FIG. 4 is a flow-chart of an exemplary decision sequence in which the user's judgment has been impaired by past decisions. Throughout the entire decision tree, the user is offered, enticed and cajoled into accepting alcohol and/or drugs. At each instance, a decision button is displayed, and the user is free to choose yes or no. Tracking module 600 records the number of times the user accepts a drink and/or drugs. As the user accepts drinks and/or drugs, warnings are given about decreased judgement, the body weight of the first-person character, and the total drinks/drugs consumed thus far. Specifically, tracking module 600 sets initial variables "BEER"=0, and "DRUGS"=0. The variables are incremented with each acceptance, and the cumulative acceptances affect and/or foreclose certain decisions in the manner shown in FIG. 4.

Block 800 represents a combination of video and voice which sets the context of the situation. The sequence progresses to block 820 which textually displays a particular decision the user must make. The user is presented with two buttons (stay 830 and return 835) that are displayed on the screen. In this particular case, the user makes a selection. However, the path through the decision tree is affected by the tracking module 600 record of the variables "BEER" and "DRUGS". Specifically, if "BEERS"=5 (blood alcohol approx. >0.2), or if "BEERS"=3 and "DRUGS"=1, then the return choice 835 is foreclosed to the user and a forced stay 830 decision is made. Otherwise, the user is free to return to the party. Such feedback from tracking module 600 is especially appropriate at decisions such as whether to engage in sex, protected vs. unprotected sex, whether to have more beer/drugs, etc. This heightens the reality of the virtual experience and the effectiveness of the teaching system.

A fourth feature of the Interactive/Contextual Adventure 510 that serves to heighten the reality of the virtual experience is the presence of virtual advisors that serve as a conscience to the user. The virtual advisors may be analogized to an angel and devil perched on the shoulders of the user and feeding good and bad advice, respectively. The virtual advisors are introduced as peers early in the Interactive/Contextual Adventure 510, and they arise at regular intervals throughout as the Interactive/Contextual Adventure 510 proceeds through the decision tree structure. Again, each decision is preceded with a multimedia presentation that sets up the context of the decision, and the presentations include a series of video/audio clips. Whenever the user is prompted to make a high-risk but tempting decision, the user is given the benefit of advice on both sides from a series of two or more fleeting multimedia advisor clips. In the presently preferred embodiment, the advisor clips are most often presented in independent and relatively smaller windows that are superimposed and move across the main image on the video display.

Figure 5:
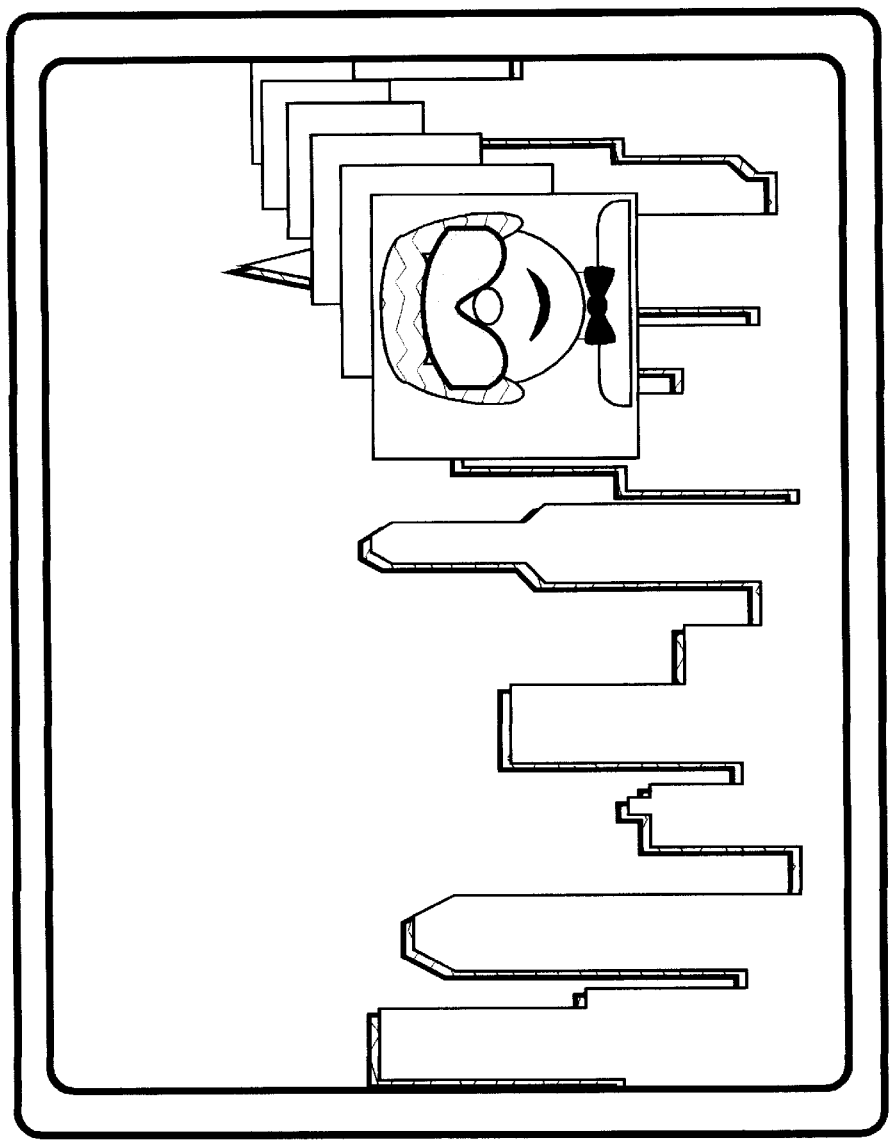
FIG. 5 is a perspective drawing illustrating one example of the use of advisors.

FIG. 5 gives an example of the use of advisors. In the illustrated example, their are two advisors including an angel 910 for advocating the right decision and a devil 920 for advocating the wrong (but often tempting) one. If, for instance, the user is confronted with a decision as to whether to have protected or unprotected sex, the advisors may appear on the screen and deliver their advice. In the presently preferred embodiment, the advisors are displayed not as icons but as fall-motion video images of human faces that are intended to serve as peer advisors (to which the user can relate). The faces are preferably those of characters previously introduced in the body of the Interactive/Contextual Adventure 510. The full-motion video faces are shown in an approximately 2" by 2" window superposed on the main screen image. The window for the first advisor will appear on the display and will move across the screen to a central position. The video face is shown speaking, and accompanying voice audio is played to the user. The voice may say, for example, "Go with the flow, go ahead, just do it man. . . " A still image of the video face may be left frozen on the screen (and/or faded out). Meanwhile, the window for the second advisor appears on the display and moves across the screen to a central position. Again, the video face is shown speaking, and accompanying voice audio is played to the user. The voice may say, for example, "if you don't wear a condom you are sleeping with everyone that she has ever slept with". The advisors paint all sides of the argument, and do so in a manner that simulates actual peer pressure and advice. This drives home the difficulty and gravity of each of the user's decisions and makes the decisions all the more realistic.

Figure 6:
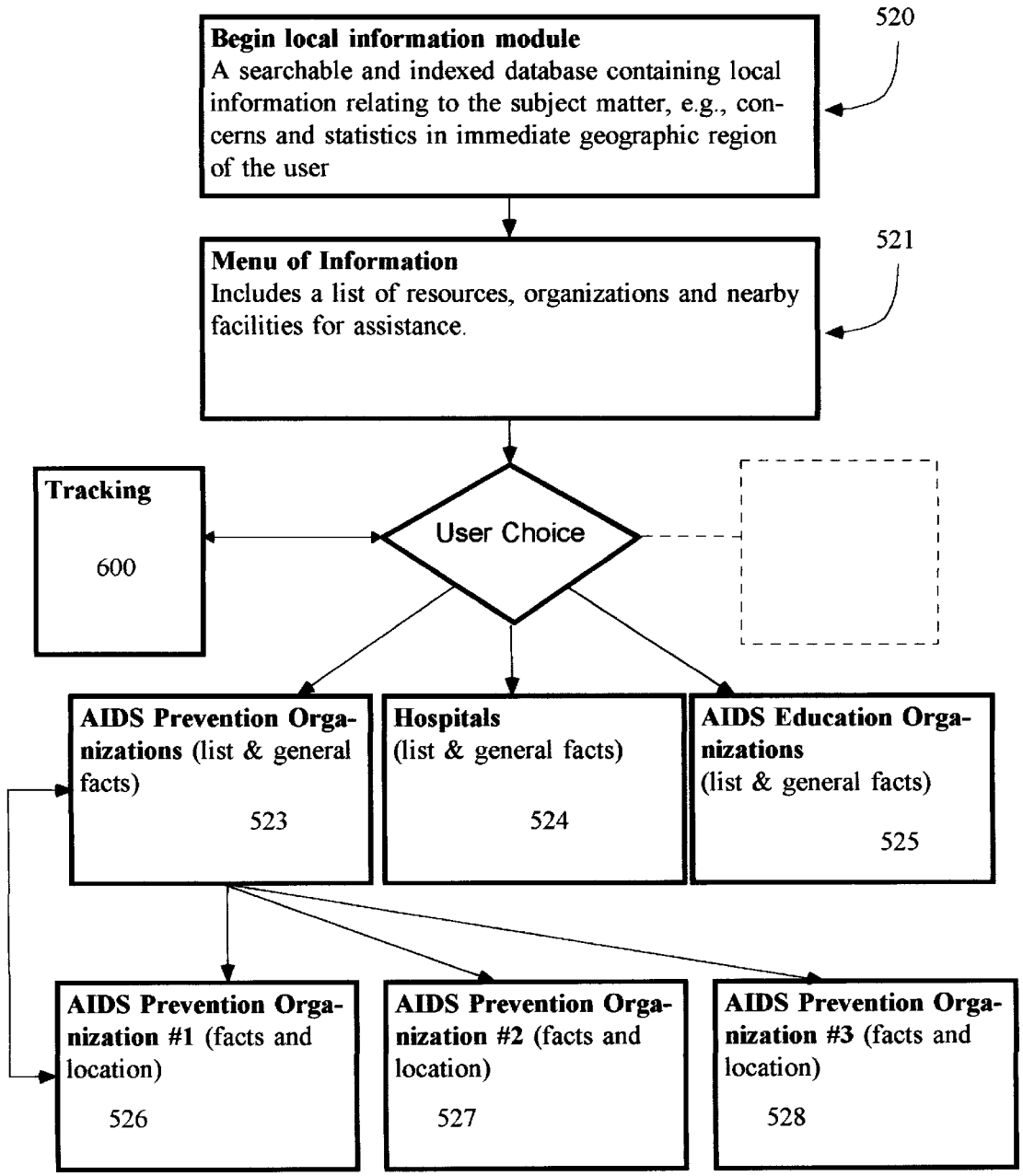
FIG. 6 is a more detailed flow-chart of the second primary learning module, e.g., the local information module 520.

FIG. 6 is a more detailed flow-chart of the second primary learning module, e.g., the local information module 520. This module is a database containing local information relating to the subject matter, e.g., subject matter concerns and statistics in the geographic region/environment of the user. It includes lists of resources, organizations, and nearby facilities for assistance. Menu items are color-coded so the user can click to obtain more specific information. Preferably, the database also allows a search by keyword to locate specific topics or frequently requested subjects of interest tailored to geographic region. As an example, the HIV/AIDs learning system has successively scaled maps that allow the user to pinpoint/search for local testing sites, local statistics, and local trends. This is done through a process of map magnification starting with an initial map of the United States.

Figure 7:
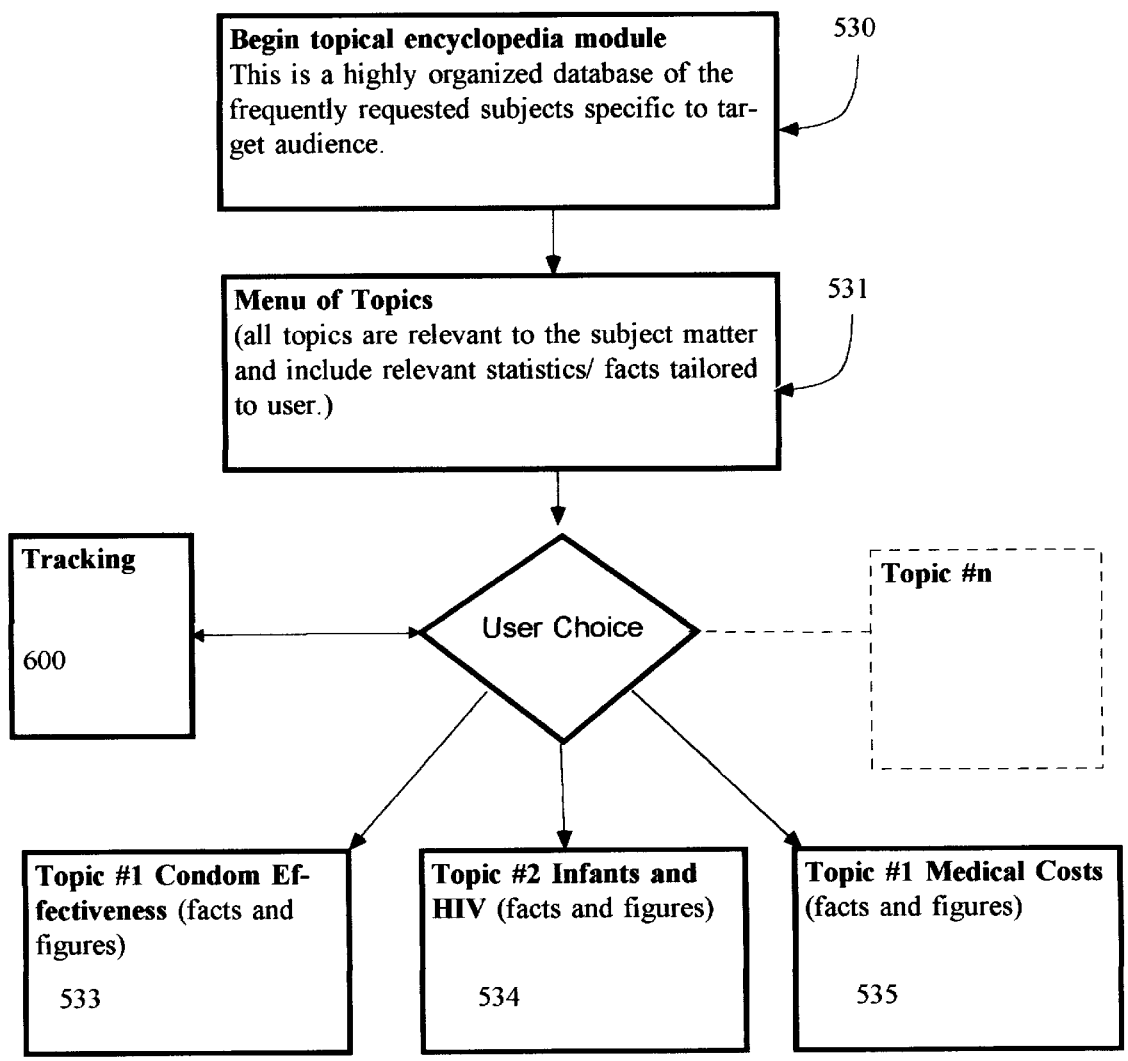
FIG. 7 is a more detailed flow-chart of the third primary learning module, e.g., the topical encyclopedia module 530.

FIG. 7 is a more detailed flow-chart of the third primary learning module, e.g., the topical encyclopedia module 530. This is a highly organized database of frequently requested subjects. Direct answers are provided to 25–50 questions on the subject matter as determined by a survey of the user target audience. Subjects are arranged by keyword; each subject includes appropriate graphs, photos, and/or video. Key words and definitions are underlined or color-coded to let the user click or touch the screen to obtain more specific information. Preferably, the database also allows a search by keyword to locate specific topics of interest. The user can scroll down a list of keywords or type in a particular keyword. The format of text/images/videos are tailored to the audience: lingo, speech patterns, literacy level, demographics. The content of the frequently requested subjects are specific to the context of the user's demographics and region.

Figure 8:
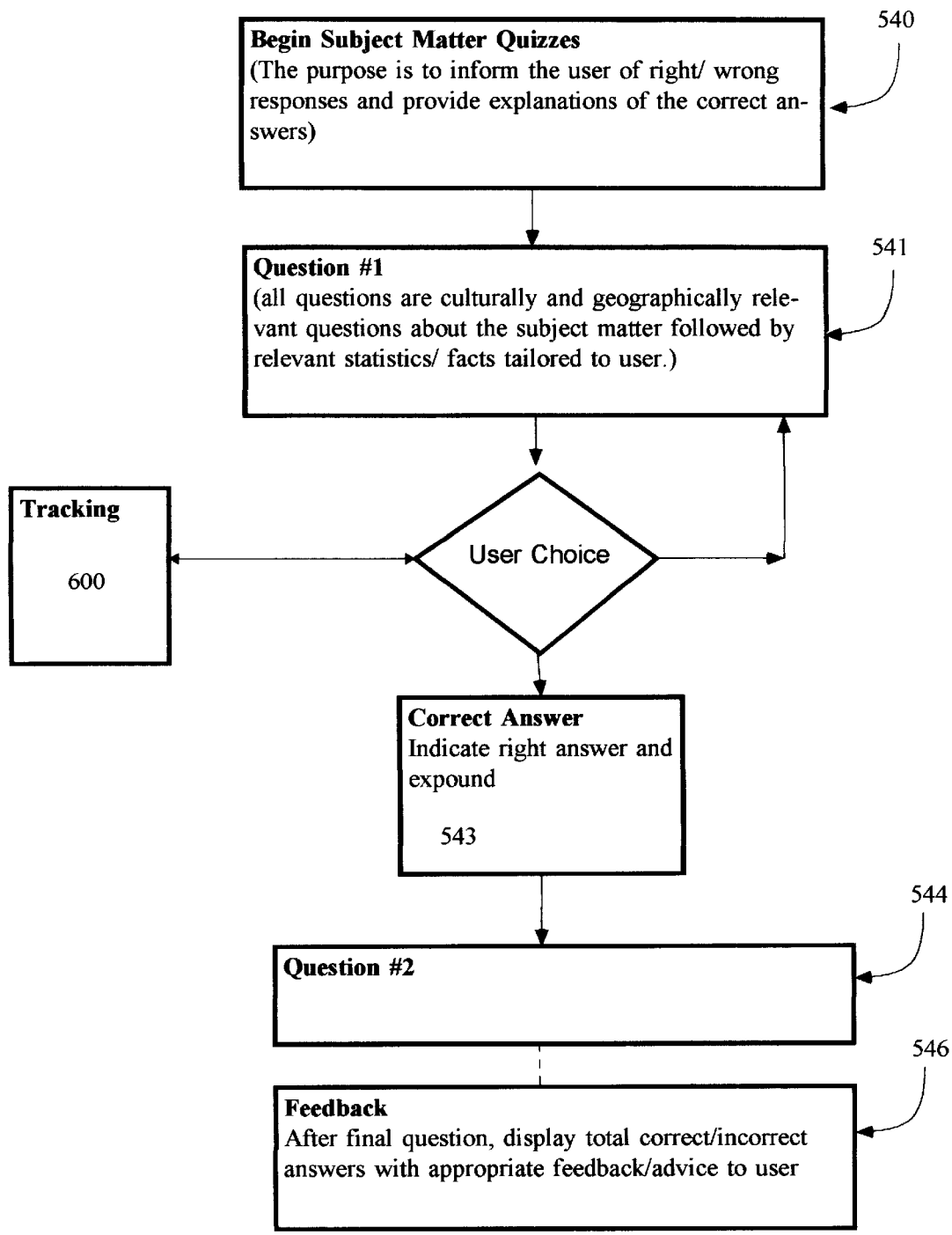
FIG. 8 is a more detailed flow-chart of the fourth primary learning module, e.g., the Subject matter quizzes module 540.

FIG. 8 is a more detailed flow-chart of the fourth primary learning module, e.g., the Subject matter quizzes module 540. This includes a series of subject matter quizzes, each including culturally and geographically relevant questions about the subject matter presented. After a question, e.g., question 541 has been presented, the user indicates their answer on a multiple choice menu. Once the answer is given 543, the answer is expounded upon with relevant statistics/facts tailored to the user. Then the next questions 544 et seq. are presented in succession. The purpose of the subject matter quizzes 540 is to inform the user of right/wrong responses, provide a detailed explanation of the correct answer, and/or suggest where/how to find missed information. The quiz ends with a correct/incorrect total and advice/encouragement on improvement 546.

Figure 9:
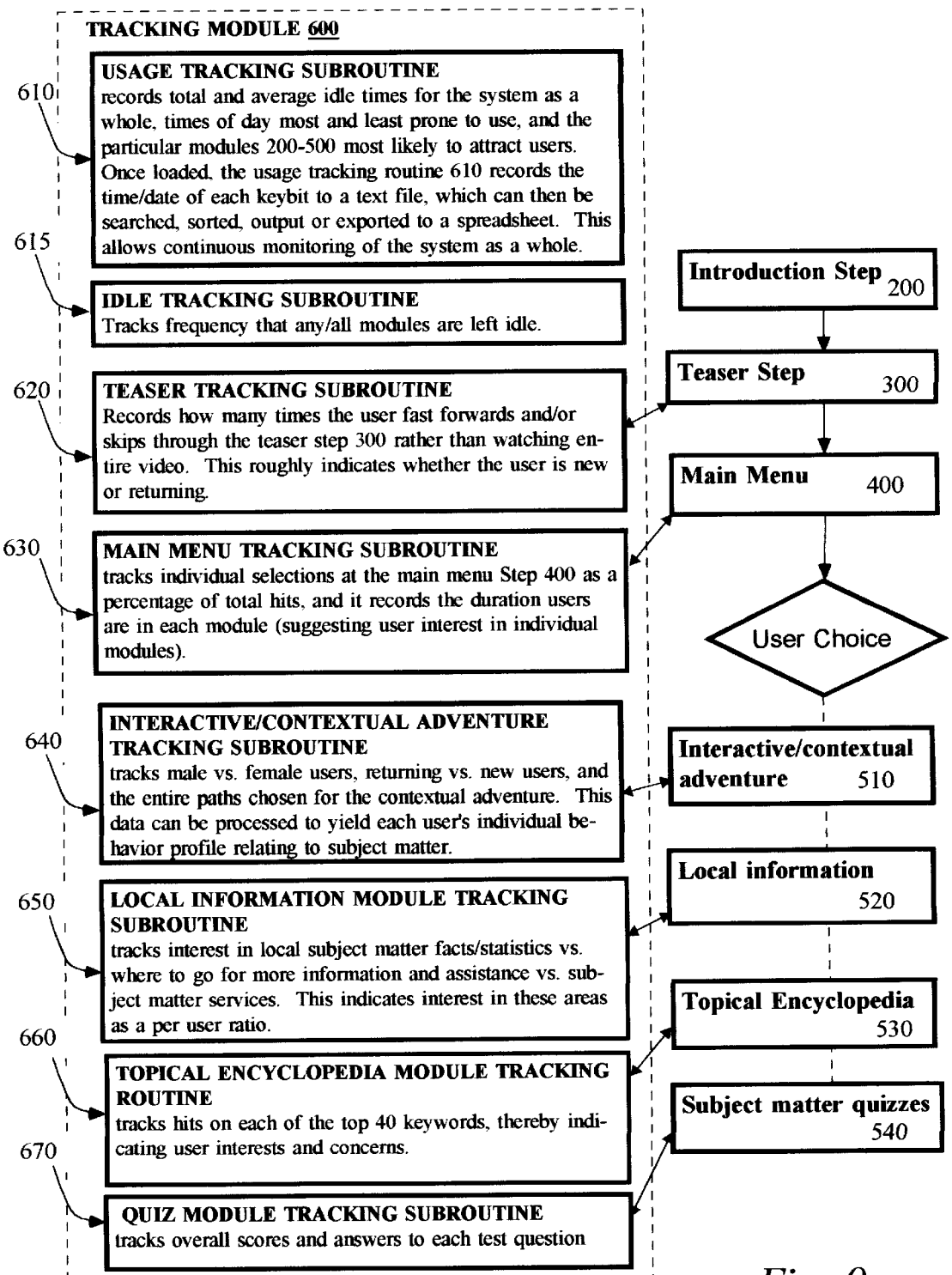
FIG. 9 is a more detailed flow-chart of the fifth primary learning module, e.g., tracking module 600.

FIG. 9 is a more detailed flow-chart of the fifth primary learning module, e.g., tracking module 600. The system is capable of recording user information and tracking user decisions and other characteristics by tracking module 600. Local (user-specific) information gained from tracking module 600 is processed and used in administering the program to the immediate user. Global (multiple-user) data is used to customize the program for each particular target audience, and to inform local health authorities of specific behavior areas that need continued intervention.

Tracking module 600 includes a number of tracking subroutines to track the choices/decisions of the immediate user and, depending on the target audience and hardware implementation of the system, includes global usage tracking and statistical analyses across multiple users. Of course, global usage tracking is not necessary or desirable in the CD-ROM implementation of the system because it is contemplated that a single-user will purchase and make private use of the system. Global data that spans multiple users would be unavailable and/or statistically insignificant in this case. However, deployment of the system in the kiosk-type architecture (to be described) or on a local or wide area network will expose the system to use of a more public nature and global tracking will become far more valuable and statistically significant. In any case, it is the system operator's decision as to which subroutines of the tracking module will be operative (global and/or local tracking) for any given application. Consequently, the tracking module 600 will be discussed herein as generically including all such subroutines.

The first is a usage tracking subroutine 610 which records total and average idle times for the system as a whole, times of day most and least prone to use, and the particular modules 200–500 most likely to attract users. Once loaded, the usage tracking subroutine 610 records key hits and the times at which they occur, and thereby continuously monitors the system as a whole.

Tracking Module 600 also includes a number of module-specific tracking subroutines including: 1) a teaser tracking subroutine 620; 2) a main menu tracking subroutine 630; 3) an interactive/contextual adventure tracking subroutine 640; 4) a local information module tracking subroutine 650; 5) a topical encyclopedia module tracking subroutine 660; and 6) a subject matter quizzes module tracking subroutine 670.

The Teaser Tracking Subroutine 620 records how many times the user fast forwards and/or skips through the teaser step 300 rather than watching the entire teaser video. This roughly indicates whether the user is new or returning.

The Idle Tracking Subroutine 615 tracks the frequency that any or all modules are left idle.

It is noteworthy that Usage Tracking Subroutine 610, Teaser Tracking Subroutine 620, and Idle Tracking Subroutine 615 are typically used only for a public deployment of the system in order to obtain statistically significant data across a large number of users. Only in these cases (e.g., kiosk-type or networked system architecture) is it worthwhile for public health authorities to monitor tracked data.

The Main Menu Tracking Subroutine tracks individual selections at the Main Menu Step 400 as a percentage of total hits, and it records the duration users are in each module (suggesting user interest in individual modules).

The Interactive/Contextual Adventure Tracking Subroutine 640 prompts the user to input information in order to track male vs. female users and returning vs. new users. It then tracks the entire paths chosen for the interactive/contextual adventure. The data can be processed to yield each user's individual behavior profile relating to subject matter. The data can be exported to commercially available spreadsheet programs to give each decision point a total number of hits, find the most typical paths for the target audience, output the most prevalent lifestyle risks, perform a simple knowledge assessment, and provide a sample of behavior choices in which the target audience is engaging.

The local information module tracking subroutine 650 tracks interest in local subject matter facts/statistics, any user selections seeking where to go for more information and assistance, and any other interest in local subject matter services. The data is processed to indicate user interest in these areas as a per user ratio.

The topical encyclopedia module tracking subroutine 660 tracks hits on each of the top 40 questions/keywords, thereby indicating user interests, concerns and lack of knowledge. This in turn provides information useful for more specific subject matter intervention.

Finally, the subject matter quizzes module tracking subroutine 670 tracks overall scores and answers to each test question presented during the Subject Matter Quizzes 540. This data indicates levels of user knowledge in specific areas, providing guidance for more focused subject matter interventions.

The tracking results can indicate to the public health authorities, educators, medical professionals, and lawmakers/enforcement officials at the local and national levels areas where specific interventions are called for. Behavior modification encompasses a full spectrum of educational, environmental, economic and policy components. The present learning system not only teaches, but it can learn as well. Through understanding of the user by their decisions and knowledge tracking module 600, the system performs local, targeted community-based research which has traditionally been very difficult and very expensive. By tracking module 600, conclusions can be shared to all concerned entities so that the full spectrum of prevention can be brought to bear. As an example, in the HIV/AIDs context, the tracking module 600 indicates high user intravenous drug use, low knowledge of the risks, and limited interest in local testing sites. The response may include more education of the risks of drug use through other methods, a needle exchange program, increased availability of drug treatment programs, and confidential testing sites. Hospitals could be alerted to monitor emergency room admissions, council possible i.v. drug users, and urge testing. Many such examples are possible.

Once the user has completed any/all of the desired modules, the user is returned to the Main Menu 400 (see FIG. 2).

In another preferred embodiment of the invention, the architecture is provided in the form of a kiosk including a touch-sensitive display so that a user can enter data and respond to questions from the computer via the screen.

Figure 10:
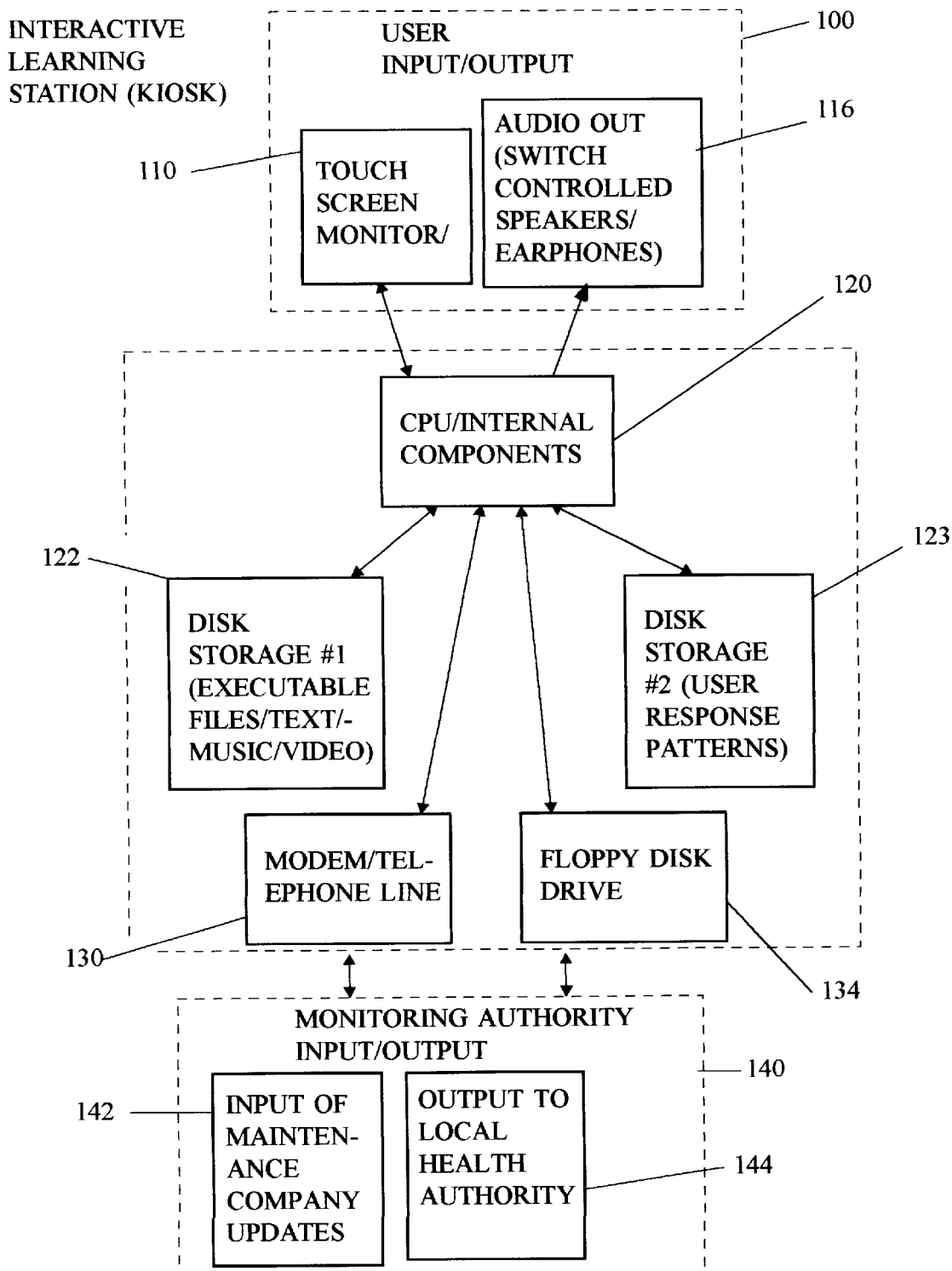
FIG. 10 is a block-diagram of a kiosk computer architecture including the components necessary to run the software of the present invention.

FIG. 10 is a block-diagram of a kiosk computer architecture including the components necessary to run the software of the present invention.

To employ the kiosk architecture as shown in FIG. 10, the user will operate a kiosk workstation that may comprise all of the devices indicated in block form within the dotted lines of FIG. 10. As in a PC, the kiosk architecture includes conventional CPU/Internal Components 120 such as, for example, an Intel Pentium microprocessor with Triton peripheral chipset mounted on an appropriate motherboard. Again, more or less powerful CPU systems can be used, but it is suggested that minimum system performance is realized with a 66 Mhz CPU and at least 8 Mb RAM. Different architectures and operating systems may also be used such as, e.g., MacIntosh.

The user input/output 100 is consolidated in a touch screen monitor/video output device 110 which can be a conventional touch-screen monitor attached via a serial port to the CPU/Internal Components 120. It is suggested that best video results are obtained with an SVGA 17" monitor. An integral audio output 116 is also provided proximate the touch screen monitor/video output device 110, and this allows the computer to emit sounds via headphones or speakers, in both cases driven by a sound board as is well known in the art.

A first disk storage 122 is a commercially available hard disk drive component attached via known IDE or SCSI interfaces to the CPU/Internal Components 120. The first disk storage 122 stores all executable files as well as text, music and video clips, etc.

A second disk storage 123 is likewise a commercially available hard disk drive component attached via known IDE or SCSI interfaces to the CPU/Internal Components 120. The second disk storage 123 stores all information returned from the tracking module 600.

The kiosk architecture must also include resident firmware including an operating system and all appropriate drivers for all internal components and the above-described devices, including MPEG-compliant playback software and/or hardware for playing MPEG compressed full-motion video files.

There is also provision of telephonic data communications via a standard modem 130 connected between CPU/Internal Components 120 and a telephone jack. This allows remote communication between outside sources, e.g., for troubleshooting/updating purposes by a maintenance company 142, and remote transmission of user statistics and behaviors to a health monitoring authority 144.

A conventional floppy disk drive 134 is also connected to CPU/Internal Components 120 to allow uploading and downloading of data to a health monitoring authority.

The foregoing description of the kiosk system architecture will be understood by one skilled in the art as merely an example of one system which could be used to implement the various embodiments of the educational method of the present invention, and that various other configurations and devices could also be used. For example, the courseware can be delivered over a local area network (LAN), wide area network, or the internet.

The operation of the software method of the present invention on the kiosk architecture is substantially the same as on the CD-ROM architecture except that the executable files and all other files already permanently reside on the first disk storage #1 122 and second disk storage #2 123, respectively. There is an initial installation step to insure that all components and software drivers (e.g., MPEG are available). The program begins (defaults to) introduction step 200, wherein the title page is displayed with a popular music clip playing in the background. The same ensuing progression of steps are followed in accordance with the user's input. The parameters of the tracking module 600, and especially the usage tracking subroutine 610 are set more stringently to default back to the introduction step 200 upon detection of an idle time of about 2 minutes.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A multimedia method for interactive behavior modification for promoting awareness of and changing high-risk behaviors, said method being administered by means of a computer system with full-motion video and audio output capabilities, the method comprising:

teaser step including teaser video/audio for attracting a user to use the system, showing highlights, and familiarizing said user with primary subject matter;

a main menu step providing a gateway to said user for executing one from among a group of primary learning modules;

a group of primary learning modules, said group at least including, an interactive adventure module comprising a user-navigable decision tree in which the user is required to make decisions of consequence to their health, said decisions being presented in real-time in the context of a first hand virtual experience in a familiar social setting as portrayed by video/audio clips, wherein the user is confronted with decisions while navigating said interactive contextual adventure module, a local information module comprising a user-navigable database of local information relating to subject matter concerns and resources in an immediate geographic region of the user, a topical encyclopedia module including a user-navigable database of frequently requested subjects and information thereon, and video/audio/images for accentuating said information, a subject matter quizzes module including a series of culturally and geographically relevant questions about the primary subject matter presented with accompanying video/audio/images; and a tracking module for tracking user information and decisions, said tracking module further comprising global tracking means operating to record and compile information on multiple user patterns for indicating where education or public health intervention may be needed, and local tracking means operating to record and compile a single user's inputs and to foreclose subsequent decisions in said interactive adventure module in accordance with said user inputs to simulate impaired judgment.

2. The multimedia method for interactive behavior modification according to claim 1, wherein said teaser step is presented in the format of a music video with popular song and video clips, and a voice-over describing the primary learning modules.

3. A multimedia method for promoting awareness and changing high-risk behaviors in areas of significant public health concern, comprising:

an interactive adventure based on a user-navigable decision tree in which the user is required to make decisions of consequence, and said decisions are presented in real-time in the context of a first hand virtual experience in a typical setting portrayed by audio/video clips, said audio/video clips being selected to simulate culturally familiar environments and typical influences such as peer pressure and need for immediate gratification, whereby the user is influenced toward making a poor decision that in actuality would compromise his/her health; and a tracking module comprising global tracking means operating to record and compile information on multiple user patterns for indicating where education or public health intervention may be needed, and local tracking means operating to record and compile a single user's inputs and to foreclose subsequent decisions in said interactive adventure in accordance with said user inputs to simulate impaired judgment.

4. The multimedia method for interactive behavior modification according to claim 3, wherein said tracking module records decisions made by all users and provides feedback to outside authorities regarding user characteristics.

5. The multimedia method according to claim 3, wherein the user is confronted with decisions whether to accept alcohol/drugs while navigating said interactive contextual adventure, and said tracking module records a number of times the user accepts said drink/drugs and forecloses subsequent decisions in accordance with said number to simulate impaired judgment.

6. The multimedia method according to claim 3, wherein said interactive adventure includes virtual advisors portrayed as superposed windows displaying full-motion video/audio clips of characters that arise at key decision points along the decision tree for giving the user advice on both sides of impending decisions.

7. The multimedia method according to claim 6, wherein said virtual advisors are full-motion video/audio clips of faces of characters previously introduced in said interactive contextual adventure.

8. The multimedia method according to claim 7, wherein said virtual advisors include multimedia video clips presented in superposed and relatively smaller windows that move across the video display.

9. The multimedia method according to claim 8, wherein said virtual advisors embody the thought process, express conflicting viewpoints, and foreshadow the range of possible outcomes of the decisions about to be made.

10. The multimedia method according to claim 3, wherein said tracking module tracks user behavior patterns, attitudes, and knowledge levels for outputting said information to local health authorities to allow focussed intervention.

11. A multimedia system for interactive behavior modification and promoting awareness of and changing high-risk behaviors that compromise the public health, comprising:

a multi-media computer system; and a multimedia behavior modification program for promoting awareness and changing high-risk behaviors in areas of significant public health concern, said program embodying a learning method comprising the following steps, a teaser step including teaser video/audio for attracting a user to use the system, showing highlights, and familiarizing said user with primary subject matter;

a main menu step providing a gateway to said user for executing one from among a group of primary learning modules;

a group of primary learning modules, said group at least including, an interactive adventure module comprising a user-navigable decision tree in which the user is required to make decisions of consequence to their health, said decisions being presented in real-time in the context of a first hand virtual experience in a familiar social setting as portrayed by video/audio clips, a local information module comprising a user-navigable database of local information relating to subject matter concerns and resources in an immediate geographic region of the user, a topical encyclopedia module including a user-navigable database of frequently requested subjects and information thereon, and video/audio/images for accentuating said information, a subject matter quiz module including a series of culturally and geographically relevant questions about the primary subject matter presented with accompanying video/audio/images, a tracking module for tracking user information and decisions, and for processing said information to provide feedback on user characteristics and patterns of use, said tracking module further comprising a usage tracking subroutine for recording usage of the method, and the modules most often used, a teaser tracking subroutine for recording usage of the teaser step, an idle tracking subroutine for tracking usage of all primary learning modules, a main menu tracking subroutine for tracking selections at said main menu step, an interactive/contextual adventure tracking subroutine for tracking paths navigated during the interactive/contextual adventure, a local information module tracking routine for tracking interest in local subject matter facts/statistics, and a topical encyclopedia module tracking routine for tracking hits to keywords in said topical encyclopedia module;

whereby results from said tracking routine are used globally to record and compile information on multiple user patterns to indicate to authorities when and where specific education or public health intervention may be needed, and locally to record and compile a single user's inputsand to foreclose subsequent decisions in said interactive adventure module in accordance with said user inputs to simulate impaired judgment.

12. The multimedia system for interactive behavior modification according to claim 11, whereby said multimedia behavior modification program automatically performs local, targeted community-based research to embellish a full spectrum of prevention.

* * * * *